(12) United States Patent
Krasinski

(10) Patent No.: US 6,966,027 B1
(45) Date of Patent: Nov. 15, 2005

(54) METHOD AND APPARATUS FOR STREAMING XML CONTENT

(75) Inventor: Raymond J. Krasinski, Suffern, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/411,756

(22) Filed: Oct. 4, 1999

(51) Int. Cl.$^7$ ............................................... G60F 17/00
(52) U.S. Cl. .................................................. 715/513
(58) Field of Search ........................... 715/513, 501.1, 715/500.1; 707/101

(56) References Cited

U.S. PATENT DOCUMENTS 6,175,820 B1 * 1/2001 Dietz ........................ 704/235

OTHER PUBLICATIONS

"XML Fragment Interchange, W3C Working Draft Jun. 30, 1999" http://www.w3.org/1999/06/WD-xml-fragment-19990630.html.*
"XML JavaBeans, Part 2" Automatically convert JavaBeans to XML documents, http://www.javaworld.com/javaworld/jw-03-1999/jw-03-beans_p.html.*
Paul Philion, "Build servlet-based enterprise Web applications" (C) Nov. 1998 http://www.javaworld.com/jw-12-1998/jw-12-servlethtml.html.*
"Extensible Mark-Language (XML) 1.0 W3C Recommendation", http://www.w3.org/TR/1998/REC-xml-19980210.
C. Perkins et al., "Options for Repair of Streaming Media", Network Working Group, Request for Comments No. 2354, Jun. 1998 ftp://ftp.isi.edu/in-notes/rfc2354.txt.
"XMLNet.", Dec. 1998 http://home.earthlink.net/%7Earabbit/xmlnet/.

* cited by examiner

*Primary Examiner*—Stephen Hong
*Assistant Examiner*—Adam M Queler

(57) ABSTRACT

A method and apparatus are disclosed for streaming XML content in a manner that allows the receiver to decode the XML data that is actually received, even if an entire XML document is not received. Each XML document is decomposed and encoded as a collection of sub-trees. Each sub-tree from the larger XML document tree can be parsed and validated by the XML receiver as if it is an independent tree. Each streamed XML document utilizes a structure node that serves as a sub-tree wrapper function around each independent sub-tree. The structure node indicates the relationship of the sub-tree to other sub-trees, thereby allowing the XML receiver to reconstruct the full tree.

8 Claims, 4 Drawing Sheets

```
      ⎧ <ROOT>
      ⎪ <A>HELLO</A>
  250 ⎨ <B>XXX</B>
      ⎪ <C><D>YYY</D><E>ZZZ</E></C>
      ⎩ </ROOT>
```

```
      ⎧ <ROOT>
      ⎪ <A>HELLO</A>
  250 ⎨ <B>XXX</B>
      ⎪ <C><D>YYY</D><E>ZZZ</E></C>
      ⎩ </ROOT>
```

METHOD AND APPARATUS FOR STREAMING XML CONTENT

FIELD OF THE INVENTION

The present invention relates to the streaming of continuous media, and more particularly, to a method and apparatus for streaming XML content.

BACKGROUND OF THE INVENTION

The Extensible Markup Language (XML) is a standard for encoding textual information that has been recommended by the World Wide Web Consortium (W3C). For a discussion of the XML standard, see, for example "Extensible Markup Language (XML) 1.0 W3C Recommendation", incorporated by reference herein. The XML standard allows XML-enabled applications to inter-operate with other compliant system for the exchange of encoded information.

XML documents store textual data in a hierarchical tree structure. Each XML document has one root node, often referred to as the root element, with the other nodes in the hierarchical tree being arranged as descendants of the root node. The XML standard specifies four types of nodes, namely, character nodes, processing instruction (PI) nodes, comment nodes and element nodes. A character node contains only one character. A processing instruction node contains a name field and a content field (a sequence of characters). A comment node has only a content filed (a sequence of characters). Character nodes, processing instruction (PI) nodes and comment nodes are always leaf nodes in an XML document. Element nodes have children, a name (often referred to as a generic identifier (GI)), and a set of attributes (keyword-value pairs). An XML-based application can store data in all the different types of nodes and in all the fields of each node type.

A number of applications, such as video on demand and other continuous media applications, have emerged for encoding and transmitting continuous media streams. The proposed MPEG-7 standard, for example, from the Motion Pictures Group, provides a specification for encoding video information as well as textual information related to the video source. Continuous media streams are typically transmitted using a packet-based communication system. Due to the unreliable nature of packet-based communication systems, however, the quality of the received stream may be impacted by packet loss. Thus, such continuous media transmission systems generally must include a mechanism that allows the receiver to adapt to lost packets. A number of techniques have been proposed or suggested for addressing packet loss in a continuous media transmission system, including redundant transmissions, retransmission, interleaving and forward error correction techniques. For a general discussion of such techniques for addressing packet loss in continuous media systems, see, for example, "Options for Repair of Streaming Media," Network Working Group, Request for Comments No. 2354 (June 1998), incorporated by reference herein.

XMLNet is an application programming interface (API) for streaming XML documents. XMLNet allows information to be transferred over the Internet or another network in real time as a series of XML documents. The XML documents are delivered to the receiver in a serial fashion. The receiver must receive an entire XML document, however, before the receiver can decode and process any of the XML content contained in the XML document. For a discussion of XMLNet, see for example "XMLNet," Dec. 9, 1998 downloadable from.

A need therefore exists for a method and apparatus that allows a receiver to decode the portions of the XML encoded content that are actually received, even if portions of the complete XML document are not received, for example, in the event of a packet loss or before the complete XML document is received. A further need exists for a method and apparatus that permits streaming of XML content in a manner that allows the transmitted XML to be decoded by the receiver even if an entire XML document is not received.

SUMMARY OF THE INVENTION

Generally, a method and apparatus are disclosed for streaming XML content in a manner that allows the receiver to decode the XML data that is received even if an entire XML document is not received. An XML receiver may decode only a portion of the streamed XML content, for example, if part of the XML data is subject to a packet loss or if the complete XML document has not yet arrived. Thus, the present invention allows the XML receiver to begin processing an XML stream in mid-transmission.

According to one aspect of the invention, each XML document is decomposed and encoded as a collection of sub-trees. Each sub-tree from the larger XML document tree can be parsed and validated by the XML receiver as if it is an independent tree. According to another aspect of the invention, each sub-tree in the streamed XML document utilizes a structure node that serves as a sub-tree wrapper function around each independent sub-tree. The structure node indicates the relationship of the sub-tree to other sub-trees, thereby allowing the XML receiver to reconstruct the full tree, provided enough of the streamed XML content is received. As used herein, a "structure node" is any node that identifies the content nodes included in a given sub-tree and indicates where the sub-tree is positioned within the larger XML document tree.

A more complete understanding of the present invention, as well as further features and advantages of the present invention, will be obtained by reference to the following detailed description and drawings.

DETAILED DESCRIPTION

Figure 1:
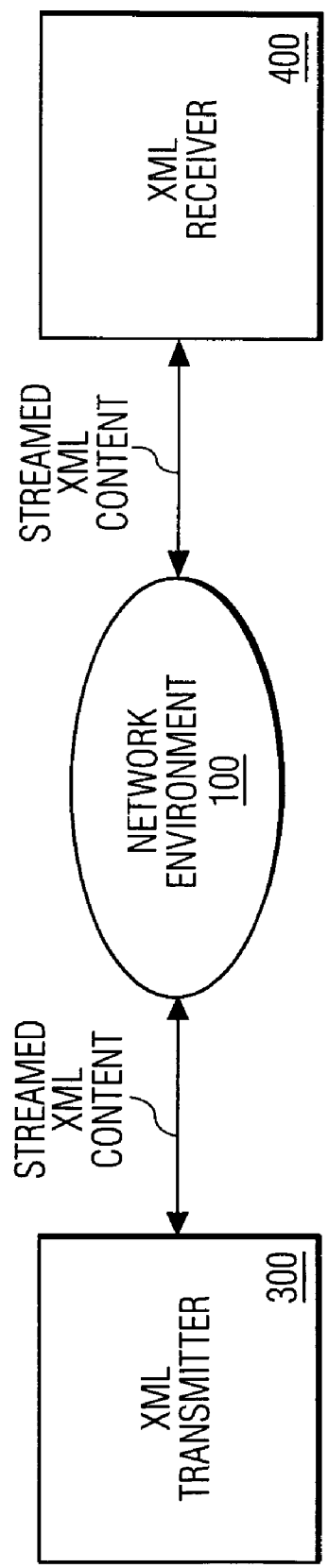
FIG. 1 illustrates a representative network environment where the present invention may operate.

FIG. 1 illustrates a network environment 100 where the present invention may operate. As shown in FIG. 1, an XML transmitter 300 transmits streamed XML content to an XML receiver 400. According to a feature of the present invention, discussed further below, the XML transmitter 300 encodes and transmits the XML content in such a manner that allows the XML receiver 400 to decode the portions of the transmitted XML content that are actually received. For example, the XML receiver 400 may decode only a portion of the streamed XML content if part of the XML data is subject to a packet loss or if the complete XML document has not yet arrived. Thus, in accordance with the present invention, the XML receiver 400 can intercept an XML stream in mid-transmission and still perform useful tasks based on the received portion of the XML encoded data. In this manner, the receiver can be confident in the integrity of the received portion of the XML encoded content.

Figures 2A, 2B:
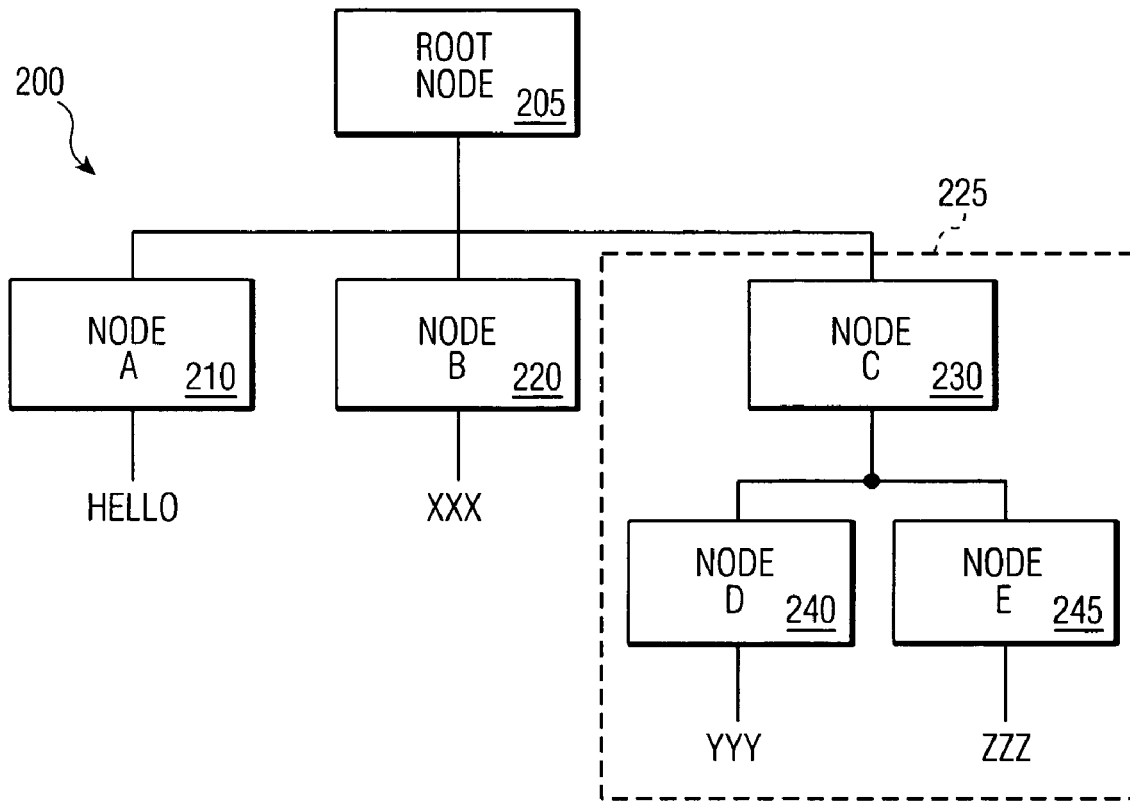
FIG. 2A illustrates a conventional hierarchical XML document tree.
FIG. 2B illustrates a portion of the corresponding pseudo-code necessary to construct the hierarchical XML tree of FIG. 2A.

According to another feature of the present invention, each XML document is encoded as a collection of sub-trees. Thus, the receiver 400 no longer needs to receive the entire XML tree. FIG. 2A illustrates an XML document tree 200, and FIG. 2B illustrates a portion of the corresponding pseudo-code 250 necessary to construct the XML tree 200 of FIG. 2A. As shown in FIG. 2A, the XML document tree 200 includes a root node 205 and a number of sub-nodes 210, 220, 230, 240 and 245.

As previously indicated, the XML tree 200 is decomposed and encoded as a collection of sub-trees. A sub-tree is said to be mounted on a given node, and contains the given node and all nodes beneath the given node in the hierarchical tree structure. For example, as shown in FIG. 2A, sub-tree 225 is mounted on node 230 and contains nodes 230, 240 and 245. Each sub-tree, such as the sub-tree 225, in the larger XML document tree 200 can be parsed and validated by the receiver 400 as if it is an independent tree. It is noted that a given sub-tree can include additional sub-trees.

According to another feature of the present invention, each sub-tree in the streamed XML document utilizes a structure node that serves as a sub-tree wrapper function around each independent sub-tree. The structure node indicates the relationship of the sub-tree to other sub-trees. In this manner, the XML receiver 400 can reconstruct the structure of the full tree 200 provided enough of the streamed XML content is received. Thus, the present invention utilizes structure nodes, in addition to the well-known XML content nodes. With reference to FIG. 2A, nodes 210, 220, 240 and 245 are content nodes, while the root node 205 and node 230 are structure nodes. In addition, the present invention modifies the XML provisions regarding Document Type Definitions (DTDs) to allow parts of the DTDs (DTD chunks) to be present with the sub-trees. The DTD chunks are used in accordance with the present invention to verify the validity of the sub-tree. In one variation, the DTD chunks are not included in the sub-trees, but rather, a reference is included to the full DTD.

Generally, document templates are utilized to parse the XML content for streamed transmission. One or more of the sub-nodes in the full XML tree 200 are treated as root nodes to establish the independent sub-trees. For example, the root node for sub-tree 225 in FIG. 2A is the node 230 upon which the sub-tree 225 is mounted. Each sub-tree has a structure node to allow the transmitted XML content to be reconstructed into the larger XML tree 200, if desired. The larger XML tree 200 can be decomposed into a collection of sub-trees in accordance with the requirements of a given user or application. For example, if the XML document tree 200 was decomposed to establish node C and everything below it as an independent sub-tree 225, the structure node for the sub-tree would indicate that content nodes D and E should be collected and attached to node C.

Thus, as used herein, a "structure node" is any node that identifies the content nodes included in a given sub-tree and indicates where the sub-tree is positioned within the larger XML document tree 200. The structure node can identify the content nodes included in a given sub-tree by generally indicating that all previous content nodes since the previous structure node should be collected, or by providing a specified list of content nodes.

Figure 3:
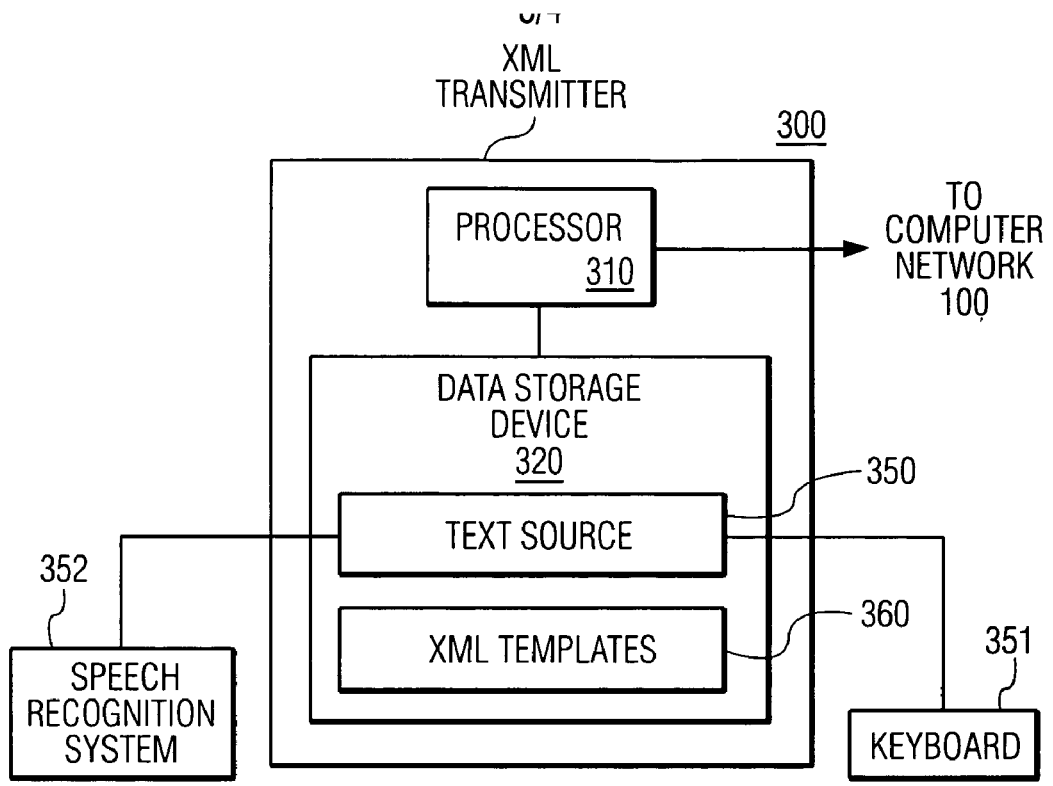
FIG. 3 is a block diagram showing the architecture of an illustrative XML transmitter in accordance with the present invention.

FIG. 3 is a block diagram showing the architecture of an illustrative XML transmitter 300 in accordance with the present invention. The XML transmitter 300 may be embodied as a general purpose computing system, such as the general purpose computing system shown in FIG. 3. As shown in FIG. 3, the XML transmitter 300 preferably includes a processor 310 and related memory, such as a data storage device 320, which may be distributed or local. The processor 310 may be embodied as a single processor, or a number of local or distributed processors operating in parallel. The data storage device 320 and/or a read only memory (ROM) (not shown) are operable to store one or more instructions, which the processor 310 is operable to retrieve, interpret and execute.

The data storage device 320 includes a text source 350 that may be retrieved from memory or generated in real-time. Thus, the text source 350 may be a pre-recorded textual file, such as a database or another document, or a document generated in real time, for example, by a user entering textual information from a keyboard 351 or by a speech recognition system 352. The data storage device 320 also includes one or more XML templates 360 that indicates how the textual information should be decomposed in constructing the XML tree 200, and the independent sub-trees. Thus, the XML transmitter 300 will process the text source using the identified XML template 360 to generate the transmitted content in a streamed XML format, in accordance with the present invention. As previously indicated, each transmitted sub-tree, such as the sub-tree 225, will include one or more content nodes and at least one structure node indicating how the sub-tree is positioned in the complete XML tree 200.

Figure 4:
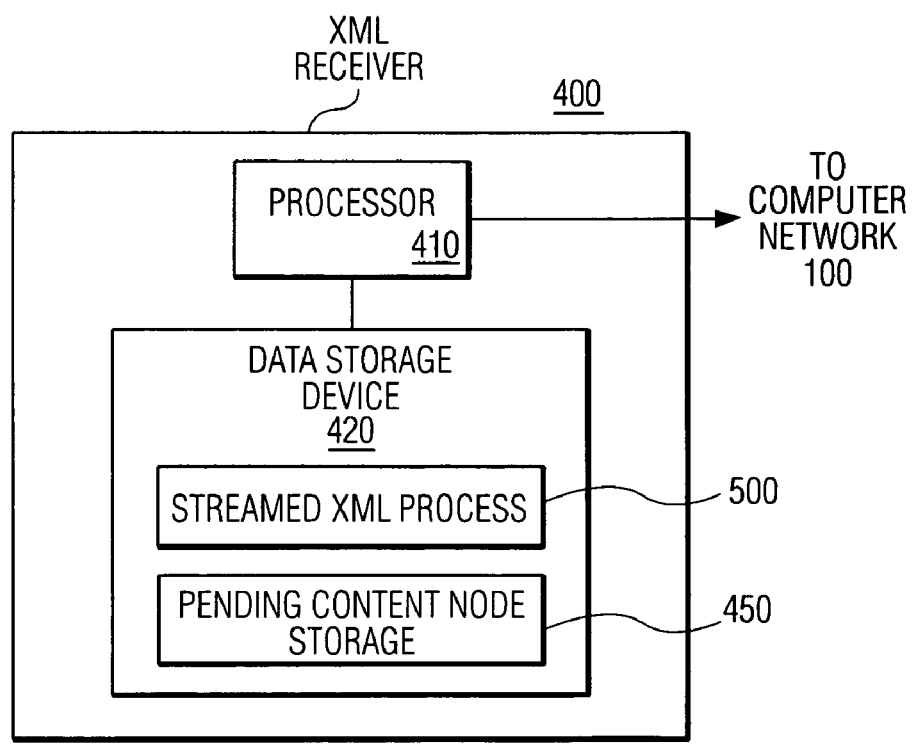
FIG. 4 is a block diagram showing the architecture of an illustrative XML receiver in accordance with the present invention.

FIG. 4 is a block diagram showing the architecture of an illustrative XML receiver 400 in accordance with the present invention. The XML receiver 400 may be embodied as a general purpose computing system, such as the general purpose computing system shown in FIG. 4, or the XML receiver 400 may be integrated with another device, such as a digital television (DTV). The XML receiver 400 includes certain standard hardware, such as processor 410 and related memory, such as a data storage device 420, as discussed above in conjunction with the XML transmitter 300 (FIG. 3).

The data storage device 420 includes a streamed XML process 500, discussed below in conjunction with FIG. 5. Generally, the streamed XML process 500 processes each node that is actually received from the XML transmitter 300, even if portions of the larger XML document are not received. In accordance with the present invention, the streamed XML process 500 utilizes the structure nodes to collect the content nodes and subsequently rebuild the full XML document tree 200. Thus, the data storage device 420 also includes storage for the received content nodes 450 that are associated with a current XML tree 200 that is being received by the XML receiver 400.

Figure 5:
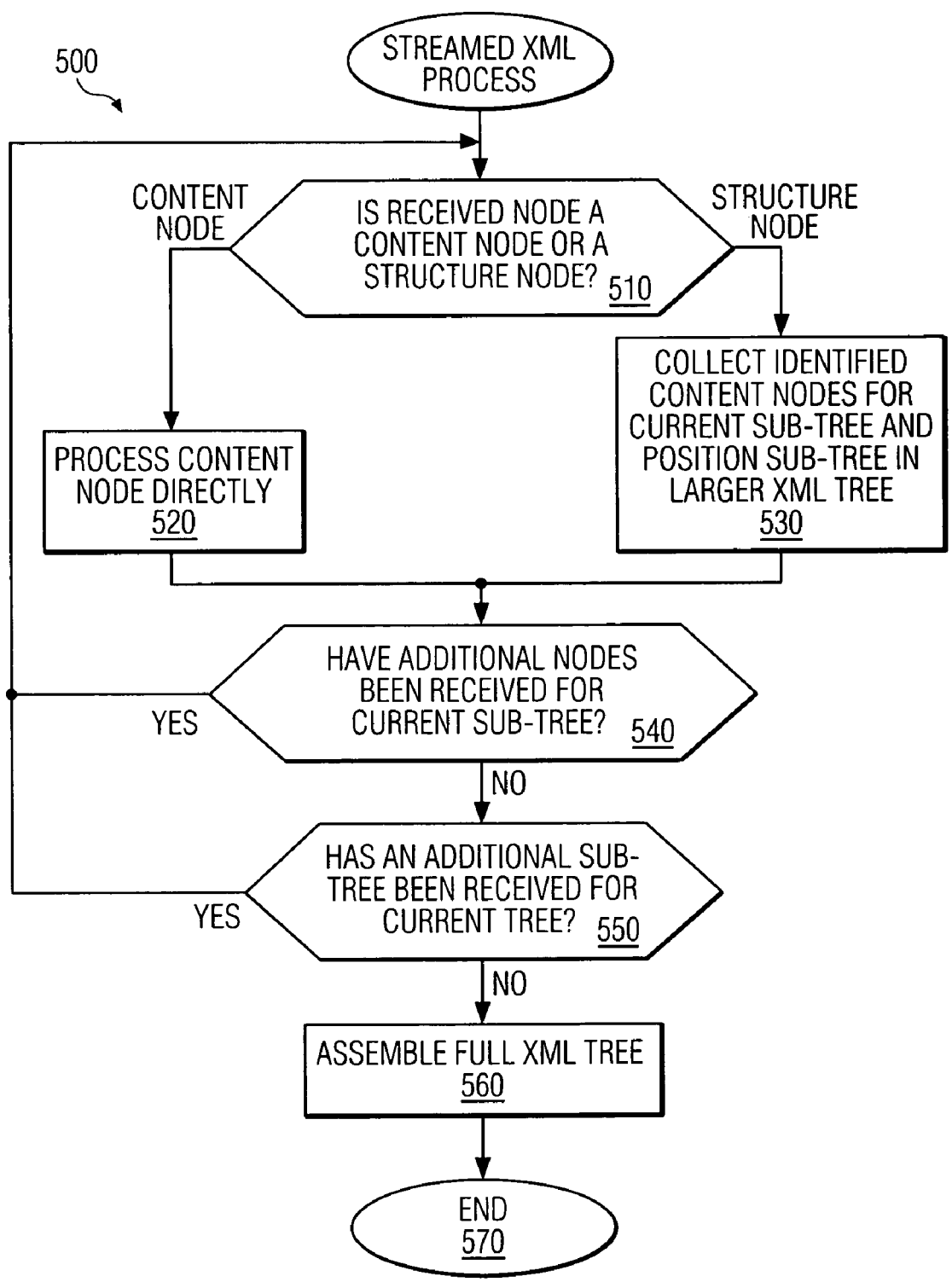
FIG. 5 is a flow chart describing an exemplary streamed XML process executed by the XML receiver of FIG. 4.

FIG. 5 is a flow chart describing an exemplary streamed XML process 500 executed by the XML receiver 400 of FIG. 4. The streamed XML process 500 processes each node that is actually received from the XML transmitter 300, even if some of the nodes are not received or are received in a corrupted manner. Any nodes that are received in a corrupted manner are not processed by the XML receiver 400. It is noted that the present invention provides a method and apparatus for processing the nodes that are actually received by the XML receiver 400, even if some nodes are lost. Techniques for recovering the nodes that are not received or are received in a corrupted manner are not within the scope of the present invention.

As shown in FIG. 5, the streamed XML process 500 initially performs a test during step 510 to determine if a received node is a content node or a structure node. If it is determined during step 510 that a received node is a content node, then the content node is processed directly during step 520, for example, by displaying the content or storing the content in a specified location. If, however, it is determined during step 510 that a received node is a structure node, then the structure node is evaluated during step 530 and the identified content nodes are assembled to form the current sub-tree, and to position the sub-tree in the full XML document 200 under construction.

Thereafter, a test is performed during step 540 to determine if additional nodes have been received that are associated with the current sub-tree. If it is determined during step 540 that there are additional nodes in the current sub-tree to be processed, then program control returns to step 510 and continues processing the next node in the manner described above. If, however, it is determined during step 540 that there are no additional nodes in the current sub-tree to be processed, then a further test is performed during step 550 to determine if an additional sub-tree has been received that is associated with the current XML tree 200.

If it is determined during step 550 that there is additional sub-tree to be processed in the current XML tree 200 being constructed, then program control returns to step 510 and continues processing the next sub-tree in the manner described above. If, however, it is determined during step 550 that there are no additional sub-trees to be processed in the current XML tree 200 being constructed, then the full XML tree 200 can be assembled during step 560. Thereafter, program control terminates during step 570 until additional nodes are received for processing.

It is to be understood that the embodiments and variations shown and described herein are merely illustrative of the principles of this invention and that various modifications may be implemented by those skilled in the art without departing from the scope and spirit of the invention.

What is claimed is:

1. A method for receiving a streamed XML document, said XML document including content nodes and structure nodes, said method comprising the acts of:
   determining if each received node of the streamed XML document is a content node, or an independent structure node associated with an independent sub-tree of said XML document;
   processing the content nodes directly; and
   recompiling at least some of independent sub-trees that comprise said XML document from said content nodes by using information contained in said structure node about a position of a particular sub-tree of the larger XML document relative to other sub-trees in at least one independent group;
   continuing to process subsequent ones of the received nodes even if one of said received nodes is not properly received by an XML receiver, wherein each sub-tree from the XML document is parsed and validated by the XML receiver as though it were an independent tree.

2. The method of claim 1, wherein said processing act further comprises the act of displaying content of said XML document.

3. The method of claim 1, wherein said processing act further comprises the act of storing content of said XML document.

4. A method of decoding a received, streamed XML document, said XML document comprised of a plurality of nodes, said method comprising the steps of:
   receiving independent groups of XML sub-trees that comprise said streamed XML document, each group of said sub-trees including at least one structure node independent of content nodes within the group and indicating how said group is positioned within said XML document relative to other groups of sub-trees; and
   continuously positioning, using said received position indication, each independent group of sub-trees to reconstitute said XML document to its state before being streamed.

5. The method of claim 4, further comprising the act of displaying content of the received XML document.

6. The method of claim 4, further comprising the act of storing content of the received XML document.

7. An XML receiver for receiving a streamed XML document, said XML document including content nodes and structure nodes, comprising:
   a memory for storing computer readable code; and
   a processor operatively coupled to said memory, said processor configured to:
   determine if each received node is a content node or a structure node,
   if said received node is a content node, determining whether said content node is associated with a particular structure node, and
   if said received node is a structure node, determining a position of an independent sub-tree of the structure node relative to other independent sub-trees that are unassociated with the structure node;
   process said content nodes directly; and
   recompile by reconstructing in mid-transmission at least some of the independent sub-trees of the larger XML document tree at a receiving end without receipt of all of the nodes;
   said XML document from said content nodes using information contained in said structure node.

8. An XML receiver for receiving a streamed XML document, said XML document including content nodes and structure nodes, comprising:
   a memory for storing computer readable code; and
   a processor operatively coupled to said memory, said processor configured to:
   receive a group of XML independent sub-trees, each group of said sub-trees including at least one structure node being independent of the content nodes and is associated with one or more content nodes, said structure node indicating how said sub-tree is positioned relative to other sub-trees within said larger XML document; and
   position at least some groups of said sub-trees in a larger XML document tree using said position without receiving all of the nodes transmitted.

* * * * *